(12) United States Patent
Talley et al.

(10) Patent No.: US 7,813,323 B1
(45) Date of Patent: Oct. 12, 2010

(54) DYNAMIC ADJUSTMENT OF REVERSE-LINK FRAME-ERROR-RATE (RFER) TARGET BASED ON REVERSE-LINK RF CONDITIONS

(75) Inventors: Ryan S. Talley, Overland Park, KS (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 644 days.

(21) Appl. No.: 11/762,534

(22) Filed: Jun. 13, 2007

(51) Int. Cl.
*G06F 15/16* (2006.01)

(52) U.S. Cl. ...................... 370/335; 370/342

(58) Field of Classification Search ............ 370/317, 370/335, 342; 455/453, 456.5
See application file for complete search history.

(56) References Cited

U.S. PATENT DOCUMENTS

| | | | |
|---|---|---|---|
| 5,475,861 A | 12/1995 | Hall | |
| 5,914,950 A | 6/1999 | Tiedemann, Jr. et al. | |
| 6,154,638 A | 11/2000 | Cheng et al. | |
| 6,397,043 B1 | 5/2002 | Kang | |
| 6,597,923 B1 | 7/2003 | Vanghi et al. | |
| 6,671,512 B2 | 12/2003 | Laakso | |
| 6,944,449 B1 | 9/2005 | Gandhi et al. | |
| 7,054,275 B2 | 5/2006 | Kim et al. | |
| 7,072,630 B2 | 7/2006 | Lott et al. | |
| 7,194,281 B2 | 3/2007 | Peng et al. | |
| 7,215,653 B2 | 5/2007 | Kim et al. | |
| 7,280,510 B2 | 10/2007 | Lohtia et al. | |
| 7,280,511 B2 | 10/2007 | Ahn | |
| 7,392,055 B2 | 6/2008 | Li et al. | |
| 7,403,800 B2 | 7/2008 | Han et al. | |
| 7,522,919 B2 | 4/2009 | Yoon et al. | |
| 7,609,635 B2 | 10/2009 | Bae et al. | |
| 7,668,561 B2 | 2/2010 | Au et al. | |
| 2001/0019943 A1 | 9/2001 | Bender et al. | |
| 2002/0094837 A1 | 7/2002 | Hamabe et al. | |
| 2003/0064741 A1 | 4/2003 | Silva et al. | |
| 2003/0134656 A1 | 7/2003 | Chang et al. | |
| 2003/0143190 A1 | 7/2003 | Iyer et al. | |
| 2003/0153272 A1 | 8/2003 | Takano | |
| 2004/0146016 A1 | 7/2004 | Kim et al. | |
| 2004/0176042 A1 | 9/2004 | Lott et al. | |
| 2004/0213182 A1 | 10/2004 | Huh et al. | |
| 2004/0241803 A1 | 12/2004 | Rosen et al. | |

(Continued)

FOREIGN PATENT DOCUMENTS

KR 20040099837 12/2004

OTHER PUBLICATIONS

Non-final Office Action from U.S. Appl. No. 11/558,337, mailed Dec. 16, 2009.

(Continued)

*Primary Examiner*—Sam Bhattacharya

(57) ABSTRACT

Methods and systems are provided for dynamic adjustment of the reverse-link frame-error-rate (RFER) target based on reverse-link RF conditions. In an embodiment, a base station provides service to at least one mobile station on a carrier in a wireless coverage area using a first RFER target. The base station calculates a reverse noise rise (RNR) value for the carrier, and then selects a second RFER target based at least in part on the calculated RNR value. The base station then provides service to at least one mobile station on the carrier in the wireless coverage area using the second RFER target.

27 Claims, 5 Drawing Sheets

U.S. PATENT DOCUMENTS

| | | | |
|---|---|---|---|
| 2005/0041612 | A1 | 2/2005 | Zhang et al. |
| 2005/0107107 | A1 | 5/2005 | Shahidi |
| 2005/0201332 | A1 | 9/2005 | Bakshi et al. |
| 2005/0288053 | A1 | 12/2005 | Gu |
| 2006/0045045 | A1 | 3/2006 | Blessent et al. |
| 2006/0223444 | A1 | 10/2006 | Gross et al. |
| 2006/0223565 | A1 | 10/2006 | Gandhi et al. |
| 2006/0234638 | A1 | 10/2006 | Mueckenheim et al. |
| 2006/0275782 | A1 | 12/2006 | Gunderson et al. |
| 2007/0026884 | A1 | 2/2007 | Rao |
| 2007/0129086 | A1* | 6/2007 | Toone .................. 455/456.5 |
| 2007/0155395 | A1 | 7/2007 | Gopalakrishnan et al. |
| 2007/0191044 | A1 | 8/2007 | Kostic et al. |
| 2007/0270100 | A1 | 11/2007 | Agrawal et al. |
| 2008/0084841 | A1 | 4/2008 | Kim et al. |

OTHER PUBLICATIONS

Unpublished U.S. Appl. No. 12/026,236, entitled "Dynamic Adjustment of Target Frame Error Rate," filed Feb. 5, 2008 in the name of Manghat et al.

Non-final Office Action from U.S. Appl. No. 11/619,348, mailed May 26, 2009.

Non-final Office Action from U.S. Appl. No. 10/910,835, mailed Nov. 19, 2007.

Final Office Action from U.S. Appl. No. 10/910,835, mailed Jun. 13, 2008.

Advisory Action from U.S. Appl. No. 10/910,835, mailed Aug. 19, 2008.

Hye Jeong Lee, "New Rate Control Scheme Based on Adaptive rateLimit for 1xEV-DO Reverse Link Traffic Channels Communications Letters," vol. 9, No. 10, Oct. 2005.

Woo Young Yeo, "An Analytical Model for Reverse Link Rate Control in cdma2000 1xEV-DO Systems," IEEE Communications Letters, vol. 9, No. 3, Mar. 2005.

Esa Tiirola, "Performance of a UMTS Uplink MIMO Scheme," IEEEplore 2003.

Ridha Nasri, "Achieving a high uplink capacity and coverage by using multicariers in 3G-WCDMA Systems," 2004 IEEE.

Non-final Office Action from U.S. Appl. No. 11/558,337, mailed May 29, 2009.

Unpublished U.S. Appl. No. 10/910,835, entitled "Dynamic Power Rail Configuration in a Wireless CDMA Communication System," filed Aug. 4, 2004 in the name of Ribas et al.

Final Office Action from U.S. Appl. No. 11/619,348, mailed Oct. 29, 2009.

Unpublished U.S. Appl. No. 11/558,337, entitled "Dynamic Adjustment of EV-DO Reverse-Link Transitional Probabilities," filed Nov. 9, 2006 in the name of inventor Andrew M. Wurtenberger et al.

Unpublished U.S. Appl. No. 11/619,348, entitled "Dynamic Adjustment of Forward-Link Frame-Error-Rate (FFER) Target," filed Jan. 3, 2007 in the name of inventor Ryan S. Talley et al.

Unpiblished U.S. Appl. No. 12/179,744, entitled "Conducting Power Control Based on Reverse-Link RF Conditions," filed Jul. 25, 2008 in the name of inventor Manoj Shetty et al.

Non-final Office Action from U.S. Appl. No. 11/619,348, mailed Mar. 25, 2010.

Unpublished U.S. Appl. No. 12/763,203, filed Apr. 19, 2010 in the name of Goyal et al., entitled "Selectively Conducting Reverse-Link Power Control and Call Admission Control,".

Unpublished U.S. Appl. No. 12/763,206, filed Apr. 19, 2010 in the name of Khanka et al., entitled "Identifying and Selectively Controlling Reverse-Noise Contribution on a Per-Access-Terminal Basis,".

* cited by examiner

| RNR | RFER TARGET |
|---|---|
| LOW RANGE | RFER_TARGET_1 |
| MODERATE RANGE | RFER_TARGET_2 |
| HIGH RANGE | RFER_TARGET_3 |

CORRELATION DATA 200

FIG. 2

DYNAMIC ADJUSTMENT OF REVERSE-LINK FRAME-ERROR-RATE (RFER) TARGET BASED ON REVERSE-LINK RF CONDITIONS

BACKGROUND

1. Technical Field

The present invention relates to wireless networks, and, more particularly, to managing transmission power between mobile stations and base stations.

2. Description of Related Art a. CDMA Networks Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." These networks typically provide communication services such as voice, Short Message Service (SMS) messaging, and packet-data communication.

Typical CDMA networks include a plurality of base stations, each of which provide one or more wireless coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access. The base station and the mobile station conduct these communications over a frequency known as a carrier, which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a wireless coverage area, base stations may provide service in a given sector on one carrier, or on more than one. An instance of a particular carrier in a particular sector is referred to herein as a sector/carrier. In a typical CDMA system, using a configuration known as radio configuration 3 (RC3), a base station can, on a given sector/carrier, transmit forward-link data on a maximum of 64 distinct channels at any given time, each channel corresponding to a unique 64-bit code known as a Walsh code. Of these channels, typically, 61 of them are available as traffic channels (for user data), while the other 3 are reserved for administrative channels known as the pilot, paging, and sync channels.

When a base station instructs a mobile station—operating on a particular sector/carrier—to use a particular traffic channel for a communication session, such as a voice call or a data session, the base station does so by instructing the mobile station to tune to a particular one of the 61 Walsh-coded traffic channels on that sector/carrier. It is over that assigned traffic channel that the base station will transmit forward-link data to the mobile station during the ensuing communication session. And, in addition to that Walsh-coded forward-link channel, the traffic channel also includes a corresponding Walsh-coded reverse-link channel, over which the mobile station transmits data to the base station.

b. Reverse-Link Transmission-Power Management i. The Power Control Bit (PCB) and the Ratio $E_b/N_t$

In CDMA networks, the transmitting power of a mobile station on the reverse link of a traffic channel at any given moment is based on a number of factors, two of which are known as the power control bit (PCB) and the ratio $E_b/N_t$. The PCB is a bit (0 or 1) that the base station sends to the mobile station on the forward link at a high frequency, on the order of 800 times per second (i.e. once every 1.25 milliseconds (ms)). The mobile station repeatedly responsively adjusts its transmission power to the base station on the reverse link. Typically, if the base station sends a 0, the mobile station will decrease the power by a set decrement, such as 1 dB, whereas, if the base station sends a 1, the mobile station will increase the power by a set increment, which may also be 1 dB. Thus, using these numbers, the mobile station's reverse-link transmission power would change by plus or minus 1 dB every 1.25 ms.

Each such 1.25-ms cycle, a typical base station determines whether to transmit a PCB equal to 0 or 1 to a given mobile station by comparing (i) a signal-to-noise ratio that the base station computes for that mobile station with (ii) a stored threshold value for that signal-to-noise ratio that the base station maintains on a per-mobile-station basis. This ratio is generally known and referred to herein as $E_b/N_t$, while the threshold is referred to herein as the $E_b/N_t$ threshold. $E_b/N_t$ compares the strength at which the base station is receiving the reverse-link signal from the mobile station ($E_b$ for "energy per bit") with the strength at which the base station is receiving signals from all other sources on the frequency of the sector/carrier on which that mobile station is operating ($N_t$ for "noise"). $E_b/N_t$, then, is a signal-to-noise ratio for the reverse-link part of the traffic channel. As stated, the base station typically computes $E_b/N_t$ at the same frequency at which it transmits the PCB, which again may be once every 1.25 ms.

Thus, in typical operation, for a given mobile station (and in fact for each mobile station that the base station is serving), every 1.25 ms, the base station compares the most recent computation of $E_b/N_t$ for that mobile station with the $E_b/N_t$ threshold for that mobile station. If $E_b/N_t$ exceeds the threshold, then the base station is receiving a strong enough signal from the mobile station, and thus it transmits a PCB of 0, causing the mobile station to reduce its reverse-link transmission power. If, on the other hand, the computed $E_b/N_t$ is less than the threshold, the base station is not receiving a strong enough signal, and thus it transmits a PCB of 1, causing the mobile station to increase its reverse-link power. Thus, the reverse-link power on the traffic channel typically stabilizes to a point that achieves an $E_b/N_t$ value (as measured at the base station) that is near the $E_b/N_t$ threshold. And this threshold can be changed during operation.

ii. Reverse-Link Frame Error Rate (RFER)

In CDMA networks, data is transmitted from the mobile station to the base station (and vice versa) in data units known as frames, which typically last 20 ms. Some frames received by the base station contain errors as a result of imperfect transfer from the mobile station, while some do not. The reverse-link frame error rate (RFER) is a ratio, computed on a per-mobile-station basis by the base station, of the number of error-containing frames that the base station receives from a given mobile station to the total number of frames that the base station receives from the given mobile station, over a given time period. Note that the RFER often also takes into account frames that are not received at all by the base station. And other things being more or less equal, the more power the mobile station uses to transmit to the base station, the lower the mobile station's RFER will be.

More particularly, at approximately the same frequency at which the base station is receiving reverse-link frames (i.e. once every 20 ms) from a given mobile station, the base station computes a RFER for that mobile station over some previous number of frames, which may be 20, 100, 200, or some other number. Thus, the base station essentially computes a RFER for some rolling window of previous frames. And each time the base station computes the RFER for that mobile station, the base station compares that computed value with a threshold: a sector/carrier-level parameter often referred to as the "RFER target," which may be around 2%.

If the RFER for that mobile station exceeds the RFER target for the sector/carrier, the base station is receiving too many error-containing frames and/or missing too many frames from that mobile station, and thus the base station will responsively increase its $E_b/N_t$ threshold related to that mobile station. In the short term, this will result in the base station's computed $E_b/N_t$ for that mobile station falling below the increased threshold, which in turn will result in the base station repeatedly sending PCBs equal to 1 to the mobile station. This, in turn, will result in the mobile station increasing its reverse-link transmission power, which will then typically stabilize at a level that will result in the base station computing an $E_b/N_t$ for that mobile station that is close to the new, increased $E_b/N_t$ threshold that the base station is maintaining for that mobile station, and perhaps result in an acceptable RFER for that mobile station.

If, on the other hand, the RFER falls below the RFER target, the mobile station may be using excessive power for transmitting on the reverse-link—in essence, the base station may be receiving a signal from that mobile station that may be considered too strong, perhaps at the expense of that mobile station's battery life, and perhaps creating excessive noise from a single mobile station on the sector/carrier. If that situation holds for a specified period of time, the base station may decrease the $E_b/N_t$ threshold that the base station is maintaining for that mobile station, resulting in the base station's computed $E_b/N_t$ repeatedly exceeding the decreased threshold. This, in turn, will result in the base station repeatedly sending PCBs equal to 0 to the mobile station, which will result in the mobile station decreasing its reverse-link transmission power, which will then typically stabilize at a level that will result in the base station computing an $E_b/N_t$ that is very close to the new, decreased $E_b/N_t$ threshold.

Thus, the base station's repeated RFER calculation for the mobile station and comparison with the RFER target for the sector/carrier causes the base station to iteratively adjust its $E_b/N_t$ threshold corresponding to the mobile station. In turn, the base station's even-more-frequent calculation of $E_b/N_t$ and comparison with its current $E_b/N_t$ threshold for the mobile station causes the base station to iteratively send PCBs of 0 (for less power) or 1 (for more power) to the mobile station, which then causes the mobile station to adjust its reverse-link transmission power on the traffic channel. This entire back-and-forth calibration process is conducted in an attempt to keep the RFER calculated by the base station and associated with the mobile station at or below what is deemed to be an acceptable threshold, which again may be around 2%.

Note that different situations may present themselves on a given sector/carrier at different times. For one, the number of mobile stations using traffic channels can vary between just a few, such as 10, to a larger number, such as 30, and perhaps approach the upper bound of 61 (assuming RC3). And, as stated, the power that the mobile stations use for transmission to the base station can vary. In particular, variables such as terrain, weather, buildings, other mobile stations, other interference, and distance from the base station can affect the RFER that the base station experiences for a given mobile station, and thus the amount of power the mobile station uses on the reverse link. Using too much power can drain battery life, and it may sometimes be the case that a mobile station reaches its maximum transmission power and still cannot achieve an acceptable RFER, in which case it may not be able to communicate with the base station.

Note that, in some implementations, a ratio other than $E_b/N_t$ may be used. In particular, each mobile station, when operating on a traffic channel, may also transmit on the reverse-link on what is known as a reverse pilot channel. The base station may then compute a ratio known as $E_c/I_o$ for that mobile station, which would be a ratio comparing (a) the power level at which the base station is receiving the reverse pilot channel ("$E_c$" for "energy per chip") and (b) the power level at which the base station is receiving all transmissions ("$I_o$") on the frequency (sector/carrier) on which the mobile station is operating (including the reverse pilot channel).

The base station would then operate with respect to $E_c/I_o$ as described above with respect to $E_b/N_t$. That is, the base station would maintain an $E_c/I_o$ threshold for each mobile station, and repeatedly compare the measured $E_c/I_o$ with the $E_c/I_o$ threshold, and send PCBs equal to 0 or 1, causing the mobile station to either decrease or increase its reverse-link transmission power. The base station would also adjust the $E_c/I_o$ threshold as described above with respect to the $E_b/N_t$ threshold, in an effort to keep each mobile station at or just below the RFER target.

iii. Reverse Noise Rise (RNR)

As stated, in general, interference can be—and often is—present on the reverse link of a given sector/carrier. That is, on the given sector/carrier, a base station will receive transmissions not only from mobile stations that are operating on that sector/carrier, but will also often receive transmissions on that frequency from other mobile stations, other transmitting devices, and/or any other sources of interference on that frequency in that area. At a given moment, the sum total of what a base station is receiving on a given sector/carrier (i.e. a given frequency)—including transmissions from mobile stations operating on that sector/carrier, as well as from all other sources—is known as the "reverse noise" on that sector/carrier.

Quite frequently (e.g., once per frame (i.e. once every 20 ms)), base stations compute a value known as "reverse noise rise" (RNR) for a given sector/carrier, which is the difference between (i) the reverse noise that the base station is currently detecting on the sector/carrier and (ii) a baseline level of reverse noise for the sector/carrier. Thus, the base station computes how far the reverse noise has risen above that baseline.

For the baseline level, CDMA networks may use a value such as the lowest measurement of reverse noise on the sector/carrier in the previous 24 hours, or perhaps an average of the 24-hour lows over the previous week, or some other value. Incidentally, some networks, including Evolution Data Optimized (EV-DO) networks, may periodically use what is known as a silent interval, which is a coordinated time period during which mobile stations know not to transmit anything to the base station. The base station can then measure whatever else is out there. In that case, the baseline level would correspond to the amount of reverse noise when the sector/carrier is unloaded. And other reverse-link-noise levels could be used as a baseline.

Other things being more or less equal, the lower the RNR is at a given moment, the more favorable the RF environment is for communication between mobile stations and the base station at that time. Correspondingly, the higher the RNR, the less favorable the RF environment is. Also, a low RNR generally corresponds to a sector/carrier being lightly loaded, in other words that is supporting communications for a relatively low number of mobile stations. A high RNR, as one might expect, generally corresponds to a sector/carrier being heavily loaded, in other words that is supporting communications for a relatively high number of mobile stations.

SUMMARY

Methods and systems are provided for dynamic adjustment of the reverse-link frame-error-rate (RFER) target based on reverse-link RF conditions. In one aspect, an exemplary embodiment of the present invention may take the form of a method. In accordance with the method, a base station provides service to at least one mobile station on a carrier in a wireless coverage area using a first RFER target. The base station calculates a reverse noise rise (RNR) value for the carrier in the wireless coverage area, and then selects a second RFER target based at least in part on the calculated RNR value. The base station then provides service to at least one mobile station on the carrier in the wireless coverage area using the second RFER target.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 2 is a simplified block diagram of an example of correlation data, in accordance with exemplary embodiments;

DETAILED DESCRIPTION OF EXEMPLARY EMBODIMENTS

1. Overview

Figure 1:
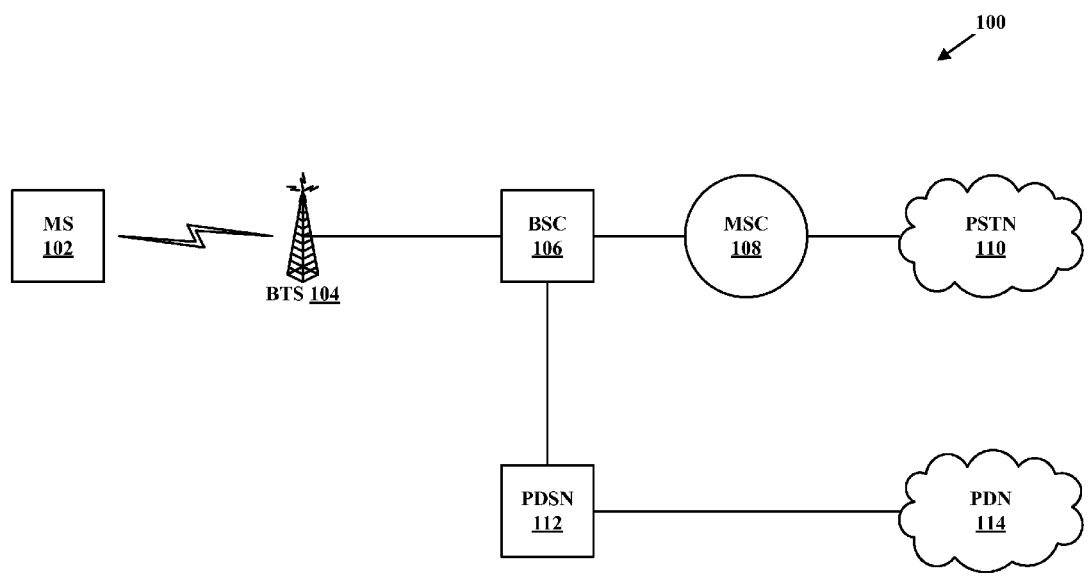
FIG. 1 is a simplified block diagram of a communication system, in accordance with exemplary embodiments.

As presently contemplated, in exemplary embodiments, a base station will, on a given sector/carrier, dynamically adjust the RFER target in response to periodic calculations of RNR. Thus, if the base station determines that the sector/carrier has a relatively high RNR, the base station will increase (i.e. relax) the RFER target for that sector/carrier. This will tend to result in mobile stations decreasing transmission power on the reverse link. That, in turn, will tend to result in the sector/carrier having more capacity, albeit perhaps at a lesser quality of service. If, however, the base station determines that the sector/carrier has a relatively low RNR, the base station will decrease (i.e. make more strict) the RFER target. This will tend to result in mobile stations increasing transmission power on the reverse link. That, in turn, will tend to result in a higher quality of service (e.g. better voice quality), albeit perhaps at a lower capacity.

As explained, a relatively low RNR may correspond to a sector/carrier being lightly loaded with mobile stations, while a relatively high RNR may correspond to a sector/carrier being heavily loaded with mobile stations. Thus, one way to characterize the present invention is that the RFER target is being made dynamically responsive to loading conditions. And metrics of sector/carrier load other than RNR can be used—alone or in combination with RNR or each other—to dynamically adjust the RFER target for the sector/carrier. Some load-metric candidates include Walsh-code occupancy and paging-channel-timeslot occupancy, which are explained herein, any other load metrics, and any combination of these. Using RNR is preferred, however, since both it and RFER are related to reverse-link transmission power.

As also explained, a relatively low RNR could correspond to favorable RF conditions on a sector/carrier, while a relatively high RNR could correspond to unfavorable RF conditions. As such, another way to characterize the present invention is that the RFER target is being made dynamically responsive to RF conditions. And the loading-conditions and RF-conditions views are not mutually exclusive. That is, RNR generally reflects some of each, and each can certainly contribute to situations where it would be advantageous to adjust the RFER target.

In some embodiments, a threshold value of RNR may be used to dynamically adjust the RFER target. If the base station determines that RNR is above the threshold, the base station may increase (relax) the RFER target for the sector/carrier, such that mobile stations will likely then reduce their transmission power on the sector/carrier, bringing RNR back down. If, on the other hand, the base station determines that RNR is below the threshold, the base station may decrease (make more strict) the RFER target for the sector/carrier, such that mobile stations will likely then increase their transmission power on the sector/carrier, which will provide a higher quality of service, but may reduce capacity and eventually push RNR back up.

In other embodiments, more than two ranges—or more than one threshold value—of RNR may be used. For example, the base station may maintain a table of RNR ranges correlated with various values for the RFER target. Upon calculating RNR on the sector/carrier, the base station may determine into which range the calculated value falls, and set the RFER target for the sector/carrier equal to the RFER-target value corresponding to that range. In other embodiments, two RNR thresholds may be used: if RNR is below the lesser of the two thresholds, the base station may decrease the RFER target; if RNR is above the greater of the two thresholds, the base station may increase the RFER target; if RNR is between the thresholds, the base station may leave the RFER target unmodified. And other examples are possible.

Furthermore, it may be taken into consideration how frequently it would be advisable to change the RFER target for a given sector/carrier. Generally stated, the base station should change the RFER target often enough to be dynamically responsive to RNR conditions on the sector/carrier, but not so often so as to inefficiently consume resources such as processing power, memory, battery power, time, and/or other resources of the base station and/or the mobile stations. For example, in a situation where RNR is hovering near a threshold value or boundary between RNR ranges, the base station could guard against switching the RFER target every time RNR crosses the threshold or boundary value.

Thus, the base station could have a limit as to how often it would change the RFER target, such as once every 10 seconds, 30 seconds, minute, etc. If one of those time periods—or some other time period—were used as the interval, then the base station could, once per interval, base its decision on the most recent measurement of RNR, a measurement near the halfway point of such an interval, an average of several samples taken over the interval, or perhaps an average of all measurements taken over the interval. And other possibilities exist as well, without deviating from the scope and spirit of the present invention.

Moreover, while embodiments of the invention are described herein for the most part with respect to a single base station and, more particularly, with respect to a single sector/carrier, this mode of explanation is for clarity and not by way of limitation. Thus, the present invention could be implemented in all or any subset of the base stations of a given wireless network, and in all or any subset of the sectors and carriers of a given wireless network as well.

The present invention, then, makes the RFER target dynamically responsive to loading and RF conditions on a sector/carrier. Preferably, the RFER target is dynamically responsive to periodic calculations of RNR. Among other advantages, the invention improves service quality at the expense of capacity in situations where capacity is less of a concern, and improves capacity at the expense of service quality in situations where capacity is more of a concern.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present as well. For example, there could be additional mobile stations in communication with BTS 104; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations, such as mobile station 102, over an air interface. The communication interface may also include one or more wired and/or wireless interfaces for communicating with at least BSC 106. As an example, a wired Ethernet interface may be included.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112. Note that the combination of BTS 104 and BSC 106 may be considered a base station.

However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the scope or spirit of the present invention.

Referring to BTS 104 as a base station for illustration, BTS 104 may maintain one or more sets of data for use in carrying out exemplary embodiments. FIG. 2 depicts one possible set of such data. In particular, FIG. 2 depicts correlation data 200, which generally (i.e. in each row of the table) correlates ranges of RNR values with RFER-target values. Thus, a low range of RNR is correlated with a RFER_TARGET_1, a moderate range of RNR is correlated with a RFER_TARGET_2, and a high range of RNR is correlated with a RFER_TARGET_3.

Note that, while three RNR ranges and associated RFER-target values are depicted in FIG. 2, any number of correlations could be used. Furthermore, these ranges and RFER targets could take on any values deemed suitable for a particular implementation. As one example, the low range could be RNR values that are less than 3 dB, the moderate range could be RNR values between 3 dB and 5 dB, and the high range could be RNR values greater than 5 dB. Further to this example, RFER_TARGET_1 could be 1%, RFER_TARGET_2 could be 2%, and RFER_TARGET_3 could be 3%. And many other examples are possible as well.

Returning to FIG. 1, MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

3. Exemplary Operation a. A First Exemplary Method

Figure 3:
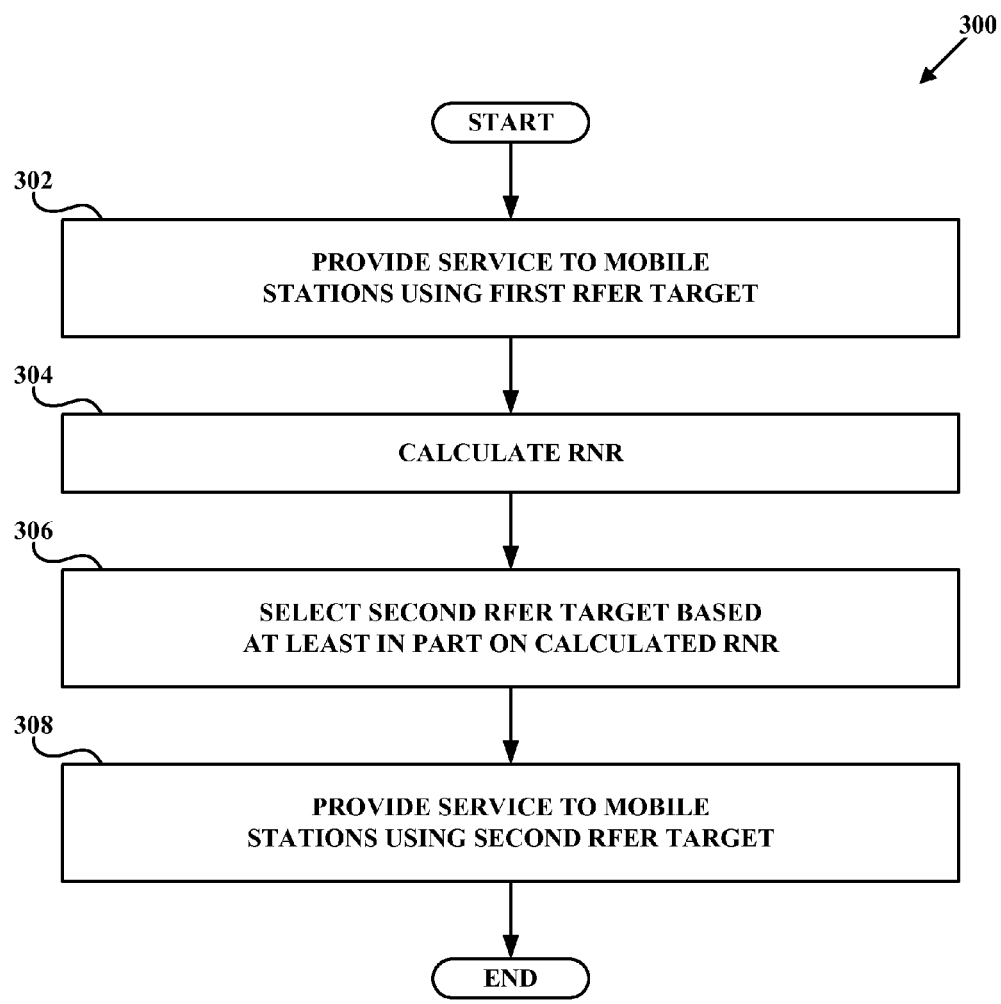
FIG. 3 is a flowchart of a method, in accordance with exemplary embodiments.

FIG. 3 depicts a flowchart of an exemplary method, in accordance with an exemplary embodiment. As shown in FIG. 3, method 300 begins at step 302, when BTS 104 provides service to at least one mobile station on a carrier in a wireless coverage area using a first RFER target. At step 304, BTS 104 calculates an RNR value for the carrier in the wireless coverage area. At step 306, BTS 104 selects a second RFER target based at least in part on the calculated RNR value. At step 308, BTS 104 provides service to at least one mobile station on the carrier in the wireless coverage area using the second RFER target.

These steps are explained in the following subsections. And it should be noted that, although method 300 is described as being carried out by BTS 104, this is not required. In some embodiments, method 300 may be carried out by BSC 106, or perhaps by a combination of BTS 104 and BSC 106. In general, method 300 could be carried out by any one or any combination of the network elements described herein, or any other network element(s).

i. Provide Service to Mobile Stations Using First RFER Target

At step 302, BTS 104 provides service to mobile station 102 on a carrier in a wireless coverage area using a first RFER target. Note that, typically, BTS 104 will provide service to multiple mobile stations, perhaps on multiple carriers, in the given wireless coverage area (and, for that matter, in multiple coverage areas), and that mobile station 102 would simply be an exemplary one of these mobile stations. Furthermore, the service provided by BTS 104 may be or include CDMA service, perhaps in conformance with one or more well-known industry standards such as IS-95 and IS-2000, both of which are incorporated by reference herein.

And the coverage area could be a cell or sector. For the balance of the description of method 300, for purposes of illustration only, one exemplary carrier in one exemplary sector will be described, and referred to, as above, as a sector/carrier. Furthermore, as an example, the first RFER target could be 2%, though other values could be used. And, in general, providing service to at least one mobile station on the carrier in the wireless coverage area using a given RFER target may involve calculating various RFERs for various mobile stations, and comparing those RFERs with the given RFER target.

If BTS 104 calculates a RFER for a given mobile station that is higher than the given RFER target, BTS 104 will typically instruct that given mobile station to increase transmission power on the reverse link (such as by increasing an $E_b/N_t$ threshold or $E_c/I_o$ threshold and by sending PCBs equal to 1), in an effort to bring its RFER back down to an acceptable level. In some implementations, if BTS 104 calculates a RFER for a given mobile station that is lower than the given RFER target, BTS 104 will instruct that mobile station to decrease transmission power on the reverse link (such as by decreasing an $E_b/N_t$ threshold or $E_c/I_o$ threshold and by sending PCBs equal to 0), which will tend to allow that mobile station's RFER to go back up.

ii. Calculate RNR

At step 304, BTS 104 calculates an RNR value for the sector/carrier. This may involve, as explained above, BTS 104 measuring a current level of noise on the reverse link of the sector/carrier, and then calculating the RNR value as the difference between that current level of noise on the reverse link and a baseline level of noise on the reverse link. And, as also explained above, this baseline level could correspond to a minimum amount of reverse noise measured in the previous 24 hours, an average of 24-hour-minimum levels of reverse noise over a previous 7-day period, an amount of noise present when the wireless coverage area is unloaded, or some other value. As a general matter, step 304 could involve calculating an average of multiple RNR values calculated during a preceding time interval.

iii. Select Second RFER Target Based at Least in Part on RNR

At step 306, BTS 104 selects a second RFER target based at least in part on the calculated RNR value from step 304. In one embodiment, step 306 may involve BTS 104 comparing the calculated RNR with a threshold value for RNR. As one example, the threshold value could be 5 dB or thereabouts. If the calculated RNR is less than the threshold RNR, BTS 104 may select the second RFER target to be less than the first RFER target. This will tend to increase mobile stations' reverse-link transmission power and drive RNR back up. If, on the other hand, the calculated RNR is greater than or equal to the threshold RNR, BTS 104 may select the second RFER target to be greater than the first RFER target. This will tend to decrease mobile stations' transmission power on the reverse link, and drive RNR back down.

And BTS 104 may have particular increments that it uses in selecting the second RFER target, depending on the comparison of the calculated RNR to the threshold RNR. Thus, if the calculated RNR is less than the threshold RNR, BTS 104 may select the second RFER target to be 1% less than the first RFER target. If, on the other hand, the calculated RNR is greater than or equal to the threshold RNR, BTS 104 may select the second RFER target to be 1% greater than the first RFER target. Thus, if the first RFER target were 2%, the second may end up being either 1% or 3%. And other increments are certainly possible as well. And, obviously, certain limitations may be accounted for as well, such as not going to or below 0%, and perhaps not going above a certain upper bound as well.

Figure 5:
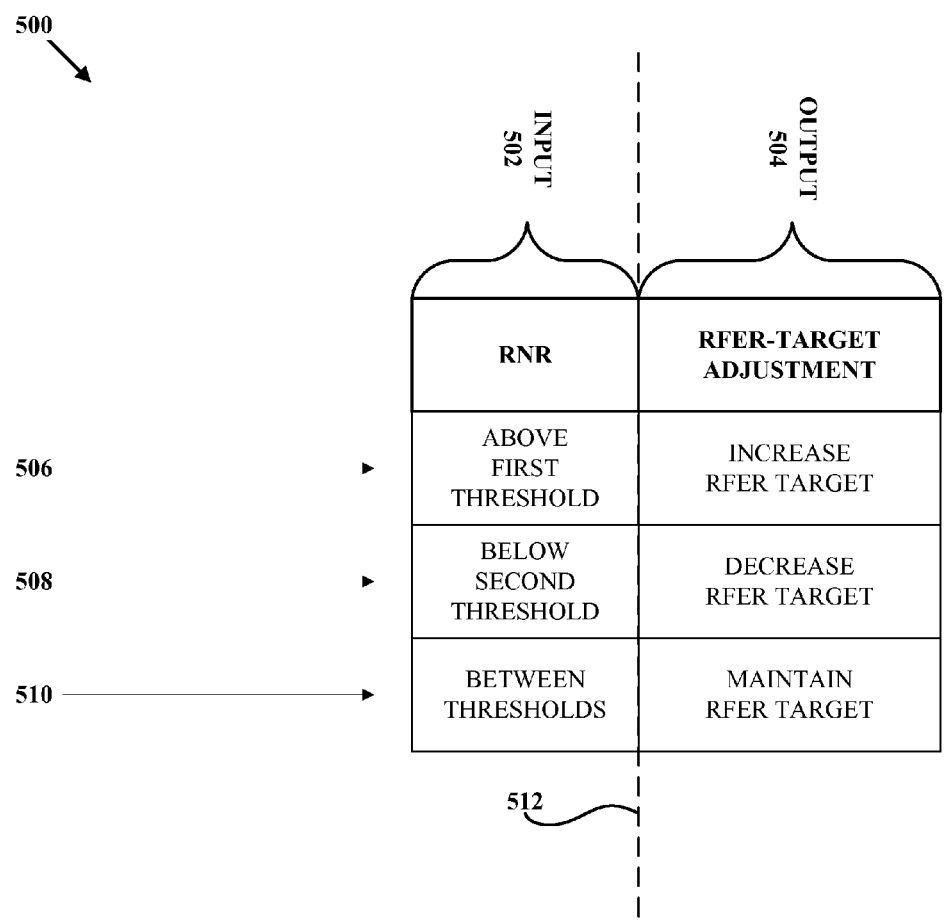
FIG. 5 is a table showing several exemplary situations, in accordance with exemplary embodiments.

In other embodiments, multiple RNR thresholds may be considered. For example, BTS 104 may compare the calculated RNR with both a lower RNR threshold and an upper RNR threshold, where the lower threshold is less than the upper threshold. If the calculated RNR is less than the lower threshold, BTS 104 may select the second RFER target to be less than the first RFER target. This is depicted in situation 508 in FIG. 5, which in general depicts three exemplary scenarios 506, 508, and 510 in accordance with exemplary embodiments. Each scenario has an input 502 (to the left of dashed line 512) that pertains to the comparison of a calculated RNR value with one or more RNR thresholds. Each scenario further has an output 504 (to the right of the dashed line 512) that provides an exemplary decision with respect to how to adjust the RFER target for the sector carrier.

If, however, the calculated RNR is both (i) greater than or equal to the lower threshold and (ii) less than or equal to the upper threshold (situation 510 in FIG. 5), then BTS 104 may select the second RFER target to be equal to the first RFER target. That is, BTS 104 may leave the RFER target for the sector/carrier unmodified. Finally, if the calculated value of RNR is greater than the upper threshold (situation 506 in FIG. 5), BTS 104 may select the second RFER target to be a value that is greater than the first RFER target.

Note that explicit comparison with one of the thresholds could include implicit comparison with the other. That is, for example, a determination that the calculated RNR is less than the lower threshold obviates the need to explicitly compare the calculated RNR with the upper threshold. Again, any RFER-target increments could be used. And, as examples, the lower threshold could be approximately 3 dB, while the upper threshold could be approximately 5 dB, though other values could clearly be used.

In other embodiments, BTS 104 may maintain data that correlates each of multiple RNR ranges with a respective RFER-target value. For example, BTS 104 may maintain (which may encompass storing and/or having access to) data such as correlation data 200 of FIG. 2. BTS 104 may thus determine that the calculated RNR falls within a particular one of the RNR ranges, and responsively select the second RFER target to be equal to whichever RFER-target value is associated with that particular RNR range. As one example, BTS 104 may determine that the calculated RNR falls within the low range, and responsively select RFER_TARGET_1.

iv. Provide Service to Mobile Stations Using Second RFER Target

At step 308, BTS 104 provides service to mobile stations, such as mobile station 102, on the sector/carrier using the second RFER target, which was selected in step 306. As described herein, this may involve determining various RFERs for mobile stations such as mobile station 102, comparing those RFERs with the second RFER target, and instructing the mobile stations to adjust their reverse-link transmission power accordingly.

v. Generally

In general, it is contemplated that method 300 will be carried out repeatedly, so as to make the sector/carrier's RFER target dynamically responsive to RNR on the sector/carrier. Thus, method 300 may be carried out once every 10 seconds, 30 seconds, minute, or any other suitable time interval, on substantially a continuous basis. As such, starting with the second such time interval, the first RFER target of step 302 would be equal to the second RFER target of the previous time interval, and operation would continue iteratively from there.

And for a given time interval, step 304 may involve calculating RNR at the end of the time interval. In other embodiments, step 304 may involve calculating RNR approximately halfway through the time interval. And in still other embodiments, step 304 may involve calculating an average of multiple RNR values calculated during the time interval. And other possibilities exist as well.

b. A Second Exemplary Method

Figure 4:
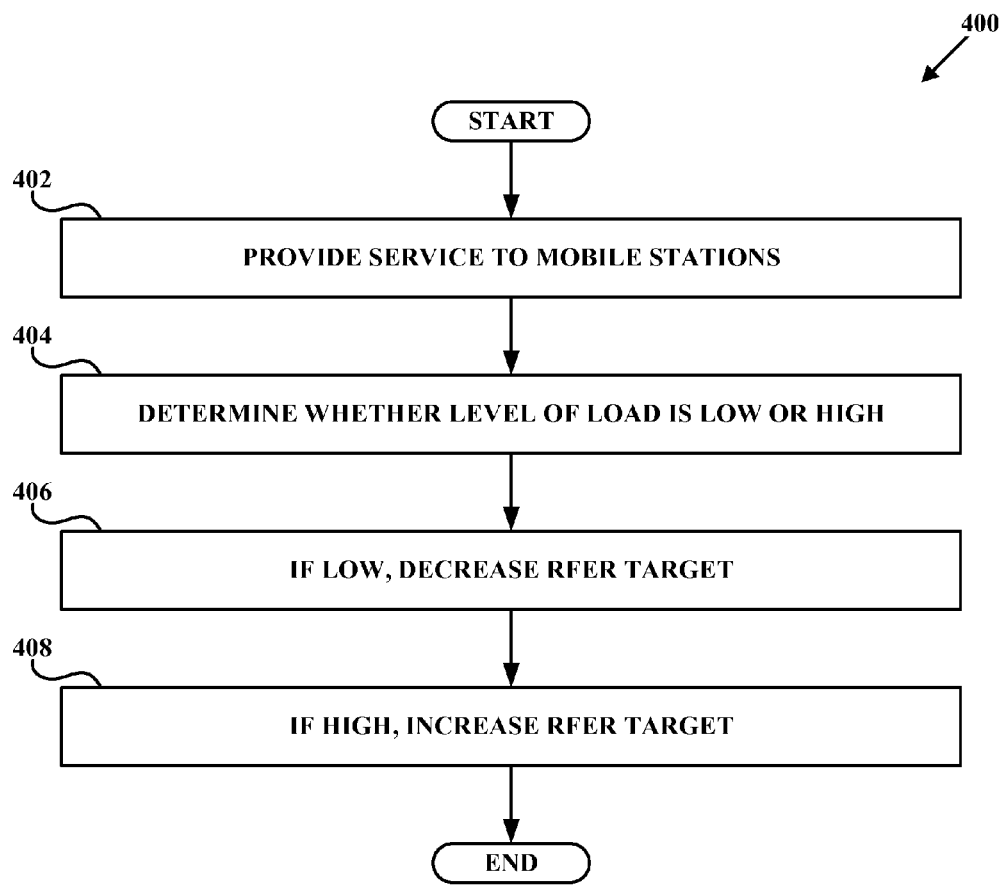
FIG. 4 is a flowchart of a method, in accordance with exemplary embodiments.

FIG. 4 is a flowchart of an exemplary method, in accordance with an exemplary embodiment. As with method 300 of FIG. 3, method 400 of FIG. 4 is described as being carried out by a BTS, and by BTS 104 in particular, though this is not required. Method 400 could be carried out by any one or any combination of the entities described as possibilities for carrying out method 300, and/or any other entity or entities. And method 400 is similar to method 300, and thus is not described in as great of detail.

As shown in FIG. 4, method 400 begins at step 402, when BTS 104 provides service to one or more mobile stations on a carrier in a wireless coverage area. At step 404, BTS 104 determines whether the current level of load on the carrier is low or high. At step 406, if the current level of load is low, BTS 104 decreases the RFER target for the carrier. At step 408, if the current level of load is high, BTS 104 increases the RFER target for the carrier.

Note that, in step 404, the determination as to whether the current level of load is low or high may involve consideration of any one or any combination of sector/carrier-load metrics. One such metric is RNR, as discussed herein. In particular, BTS 104 may calculate an RNR value and compare that calculated value with a threshold value. If the calculated RNR value is less than the threshold RNR value, BTS 104 may determine that the current level of load on the carrier is low. If, on the other hand, the calculated RNR value is greater than or equal to the threshold RNR value, BTS 104 may determine that the current level of load is high. And, as described herein, comparison with more than one threshold could be carried out as well.

Another load metric that could be used is Walsh-code occupancy, which may be computed as a ratio of (i) the number of Walsh codes currently assigned to mobile stations for traffic channels and (ii) the total number of Walsh codes generally available for traffic channels on the sector/carrier. Another possible metric is paging-channel-timeslot occupancy, which would be a similar ratio, though specifically pertaining to the finite number of timeslots available each time BTS 104 transmits the paging channel, as is known in the relevant art. And any other load metric or combination of load metrics could be used as well.

4. Conclusion

Various exemplary embodiments have been described above. Those skilled in the art will understand, however, that changes and modifications may be made to those examples without departing from the scope of the claims.

What is claimed is:

1. A method comprising:
providing service to at least one mobile station on a carrier in a wireless coverage area using a first reverse-link frame-error-rate (RFER) target;
calculating a reverse noise rise (RNR) value for the carrier in the wireless coverage area;

selecting a second RFER target based at least in part on the calculated RNR value; and providing service to at least one mobile station on the carrier in the wireless coverage area using the second RFER target, wherein selecting the second RFER target based at least in part on the calculated RNR value comprises:

comparing the calculated RNR value with a threshold RNR value;

if the calculated RNR value is less than the threshold RNR value, selecting the second RFER target to be less than the first RFER target; and if the calculated RNR value is greater than or equal to the threshold RNR value, selecting the second RFER target to be greater than the first RFER target.

2. The method of claim 1, carried out by a base station, wherein the base station comprises at, least one of a base transceiver station and a base station controller, and wherein the service comprises code division multiple access (CDMA) service.

3. The method of claim 1, wherein the wireless coverage area comprises at least one of a cell and a sector.

4. The method of claim 1, wherein the first RFER target is 2%, and wherein the second RFER target is 1% or 3%.

5. The method of claim 1, wherein calculating the RNR value comprises:

measuring a current level of noise on a reverse link; and calculating the RNR value as the difference between the current level of noise on the reverse link and a baseline level of noise on the reverse link.

6. The method of claim 5, wherein the baseline level of noise on the reverse link corresponds to at least one of a minimum amount of reverse noise measured in the previous 24 hours, an average of 24-hour-minimum levels of reverse noise over a previous 7-day period, and an amount of noise present when the wireless coverage area is unloaded.

7. The method of claim 1, wherein the threshold RNR value is approximately equal to 5 dB.

8. The method of claim 1, carried out repeatedly, once per time interval over a series of time intervals, wherein, for each time interval starting with the second time interval, the first RFER target is the second RFER target from the previous time interval.

9. The method of claim 8, wherein each time interval lasts approximately 10 seconds, approximately 30 seconds, or approximately one minute.

10. The method of claim 8, wherein, during each time interval, calculating the RNR value comprises at least one of calculating an RNR value at the end of the time interval, calculating an RNR value approximately halfway through the time interval, and calculating an average of multiple RNR values calculated during the time interval.

11. The method of claim 1, wherein calculating the RNR value comprises calculating an average of multiple RNR values calculated during a preceding time interval.

12. A method comprising:

providing service to at least one mobile station on a carrier in a wireless coverage area using a first reverse-link frame-error-rate (RFER) target;

calculating a reverse noise rise (RNR) value for the carrier in the wireless coverage area;

selecting a second RFER target based at least in part on the calculated RNR value; and providing service to at least one mobile station on the carrier in the wireless coverage area using the second RFER target, wherein selecting the second RFER target based at least in part on the calculated RNR value comprises:

comparing the calculated RNR value with both a lower threshold RNR value and an upper threshold RNR value, wherein the lower threshold RNR value is less than the upper threshold RNR value;

if the calculated RNR value is less than the lower threshold RNR value, selecting the second RFER target to be less than the first RFER target;

if the calculated RNR value is (i) greater than or equal to the lower threshold RNR value and (ii) less than or equal to the upper threshold RNR value, selecting the second RFER target to be equal to the first RFER target; and if the calculated RNR value is greater than the upper threshold RNR value, selecting the second RFER target to be greater than the first RFER target.

13. The method of claim 12, wherein the lower threshold RNR value is approximately equal to 3 dB, and wherein the upper threshold RNR value is approximately equal to 5 dB.

14. A method comprising:

providing service to at least one mobile station on a carrier in a wireless coverage area using a first reverse-link frame-error-rate (RFER) target;

calculating a reverse noise rise (RNR) value for the carrier in the wireless coverage area;

selecting a second RFER target based at least in part on the calculated RNR value; and providing service to at least one mobile station on the carrier in the wireless coverage area using the second RFER target, wherein selecting the second RFER target based at least in part on the calculated RNR value comprises:

maintaining a plurality of RNR ranges, each range associated with a respective RFER-target value; and determining that the calculated RNR value falls within a particular one of the RNR ranges, and responsively selecting the second RFER target to be equal to the RFER-target value associated with the particular RNR range.

15. A method comprising:

providing service to at least one mobile station on a carrier in a wireless coverage area using a first reverse-link frame-error-rate (RFER) target;

calculating a reverse noise rise (RNR) value for the carrier in the wireless coverage area;

selecting a second RFER target based at least in part on the calculated RNR value; and providing service to at least one mobile station on the carrier in the wireless coverage area using the second RFER target, wherein providing service to at least one mobile station on the carrier in the wireless coverage area using a given RFER target comprises:

determining that a given mobile station is experiencing a given RFER;

comparing the given RFER with the given RFER target; and if the given RFER is higher than the given RFER target, instructing the given mobile station to increase the given mobile station's reverse-link transmission power.

16. The method of claim 15, further comprising:

if the given RFER is lower than the given RFER target, instructing the given mobile station to decrease the given mobile station's reverse-link transmission power.

17. A base station comprising:

a communication interface;

a processor; and data storage comprising instructions executable by the processor to:

provide service to at least one mobile station on a carrier in a wireless coverage area using a first reverse-link frame-error-rate (RFER) target;

calculate an RNR value for the carrier in the wireless coverage area;

select a second RFER target based at least in part on the calculated RNR value; and provide service to at least one mobile station on the carrier in the wireless coverage area using the second RFER target, wherein selecting the second RFER target based at least in part on the calculated RNR value comprises:

comparing the calculated RNR value with a threshold RNR value;

if the calculated RNR value is less than the threshold RNR value, selecting the second RFER target to be less than the first RFER target; and if the calculated RNR value is greater than or equal to the threshold RNR value, selecting the second RFER target to be greater than the first RFER target.

18. The base station of claim 17, wherein the wireless coverage area comprises at least one of a cell and a sector.

19. The base station of claim 17, wherein the first RFER target is 2%, and wherein the second RFER target is 1% or 3%.

20. The base station of claim 17, wherein calculating the RNR value comprises:

measuring a current level of noise on a reverse link; and calculating the RNR value as the difference between the current level of noise on the reverse link and a baseline level of noise on the reverse link.

21. The base station of claim 20, wherein the baseline level of noise on the reverse link corresponds to at least one of a minimum amount of reverse noise measured in the previous 24 hours, an average of 24-hour-minimum levels of reverse noise over a previous 7-day period, and an amount of noise present when the wireless coverage area is unloaded.

22. The base station of claim 17, wherein the threshold RNR value is approximately equal to 5 dB.

23. The base station of claim 17, wherein the processor is operable to execute the instructions repeatedly, once per time interval over a series of time intervals, wherein, for each time interval starting with the second time interval, the first RFER target is the second RFER target from the previous time interval.

24. The base station of claim 23, wherein each time interval lasts approximately 10 seconds, approximately 30 seconds, or approximately one minute.

25. The base station of claim 23, wherein, during each time interval, calculating the RNR value comprises at least one of calculating an RNR value at the end of the time interval, calculating an RNR value approximately halfway through the time interval, and calculating an average of multiple RNR values calculated during the time interval.

26. The base station of claim 18, wherein calculating the RNR value comprises calculating an average of multiple RNR values calculated during a preceding time interval.

27. A method comprising:

providing service to at least one mobile station on a carrier in a wireless coverage area;

determining whether a current level of load on the carrier is low or high;

if the current level of load is low, decreasing a reverse-link frame-error-rate (RFER) target for the carrier; and if the current level of load is high, increasing the RFER target for the carrier, wherein determining whether the current level of load on the carrier is low or high comprises:

calculating a reverse noise rise (RNR) value for the carrier:

comparing the calculated RNR value with a threshold RNR value;

if the calculated RNR value is less than the threshold RNR value, determining that the current level of load on the carrier is low; and if the calculated RNR value is greater than or equal to the threshold RNR value, determining that the current level of load on the carrier is high.

* * * * *